(12) United States Patent
Settele

(10) Patent No.: US 7,044,631 B2
(45) Date of Patent: May 16, 2006

(54) COLLAPSIBLE WHISK

(75) Inventor: Ignaz Settele, Kaufbeuren (DE)

(73) Assignee: Maxpat Trading & Marketing (Far East) Limited, Hong Kong (HK)

( * ) Notice: Subject to any disclaimer, the term of this patent is extended or adjusted under 35 U.S.C. 154(b) by 179 days.

(21) Appl. No.: 10/754,763

(22) Filed: Jan. 9, 2004

(65) Prior Publication Data

US 2004/0141407 A1 Jul. 22, 2004

(30) Foreign Application Priority Data

Jan. 13, 2003 (GB) ................................. 0300695.4

(51) Int. Cl.
 *A47J 43/10* (2006.01)
(52) U.S. Cl. ..................................... 366/129
(58) Field of Classification Search ........ 366/129–130, 366/342–343; 15/141.1, 141.2; 99/348; 416/69–70, 227 R, 231 A
 See application file for complete search history.

(56) References Cited

U.S. PATENT DOCUMENTS

| | | | | |
|---|---|---|---|---|
| 2,092,353 A | * | 9/1937 | Kyseth et al. | ............... 366/343 |
| 2,452,923 A | * | 11/1948 | Graff | ....................... 416/227 R |
| 2,713,475 A | * | 7/1955 | Matalon | ....................... 416/69 |
| 6,206,561 B1 | | 3/2001 | Hefti | |
| 2004/0141407 A1 | * | 7/2004 | Settele | ....................... 366/129 |

FOREIGN PATENT DOCUMENTS

| | | | |
|---|---|---|---|
| DE | 000861913 C | | 1/1953 |
| FR | 2712477 | * | 5/1995 |
| JP | 2001-145576 | * | 5/2005 |

\* cited by examiner

*Primary Examiner*—Charles E. Cooley
(74) *Attorney, Agent, or Firm*—Ostrolenk, Faber, Gerb & Soffen, LLP

(57) ABSTRACT

A balloon whisk (2) has a handle (4) and a plurality of wire loops (8) extending from an end of the handle (4) and disposed spaced angularly about the handle, and an elongate collar (10) having openings (12) through which the wire loops extend of greater lateral dimension towards a central region and tapering to be of reduced lateral dimension away from the central region, the collar (10) being movable to a position away from the handle (4) where the wire loops (8) extend through the region of reduced lateral dimension and are urged together to assume a generally planar configuration.

8 Claims, 2 Drawing Sheets

COLLAPSIBLE WHISK

BACKGROUND OF THE INVENTION

The present invention relates to a culinary whisk and more particularly to a balloon-type whisk which can be collapsed.

Traditional balloon whisks of the type used for culinary preparation, for example beating eggs or cream comprise a series of generally U-shaped wire loops secured to a handle. One drawback of such whisks is that they take up a significant amount of space in a drawer.

The present invention seeks to provide a whisk which overcomes this problem.

SUMMARY OF THE INVENTION

According to the present invention there is provided a balloon whisk comprising a handle and a plurality of wire loops extending from an end of the handle and disposed spaced angularly about the handle and an elongate collar defining an opening or openings the plurality of wire loops extending through the opening or a side of each wire loop of the plurality of wire loops extending through each of the pair of openings, the plurality of wire loops being configured to be of greater lateral dimension towards a central region and tapering to be of reduced lateral dimension away from the central region, the collar being movable to a position towards the central region and away from the end of the handle, the opening or pair of openings defined by the collar having such a geometry as to urge in an angular direction the plurality of wire loops together to assume a generally planar configuration when the collar is in the position towards the central region and away from the end of the handle.

In this collapsed configuration the whisk is considerably more compact, and can be conveniently stored for example in a drawer.

The collar may comprise an elongate member having a pair of openings separated by a central crosspiece, the openings being of generally triangular shape. One or more wire loops may be formed with an inwardly directed kink constituting a detent for holding the collar in position in the collapsed condition.

BRIEF DESCRIPTION OF THE DRAWINGS

An embodiment of the invention is now described, by way of example only, with reference to the following drawings in which.

DESCRIPTION OF THE PREFERRED EMBODIMENTS

Figures 1, 2:
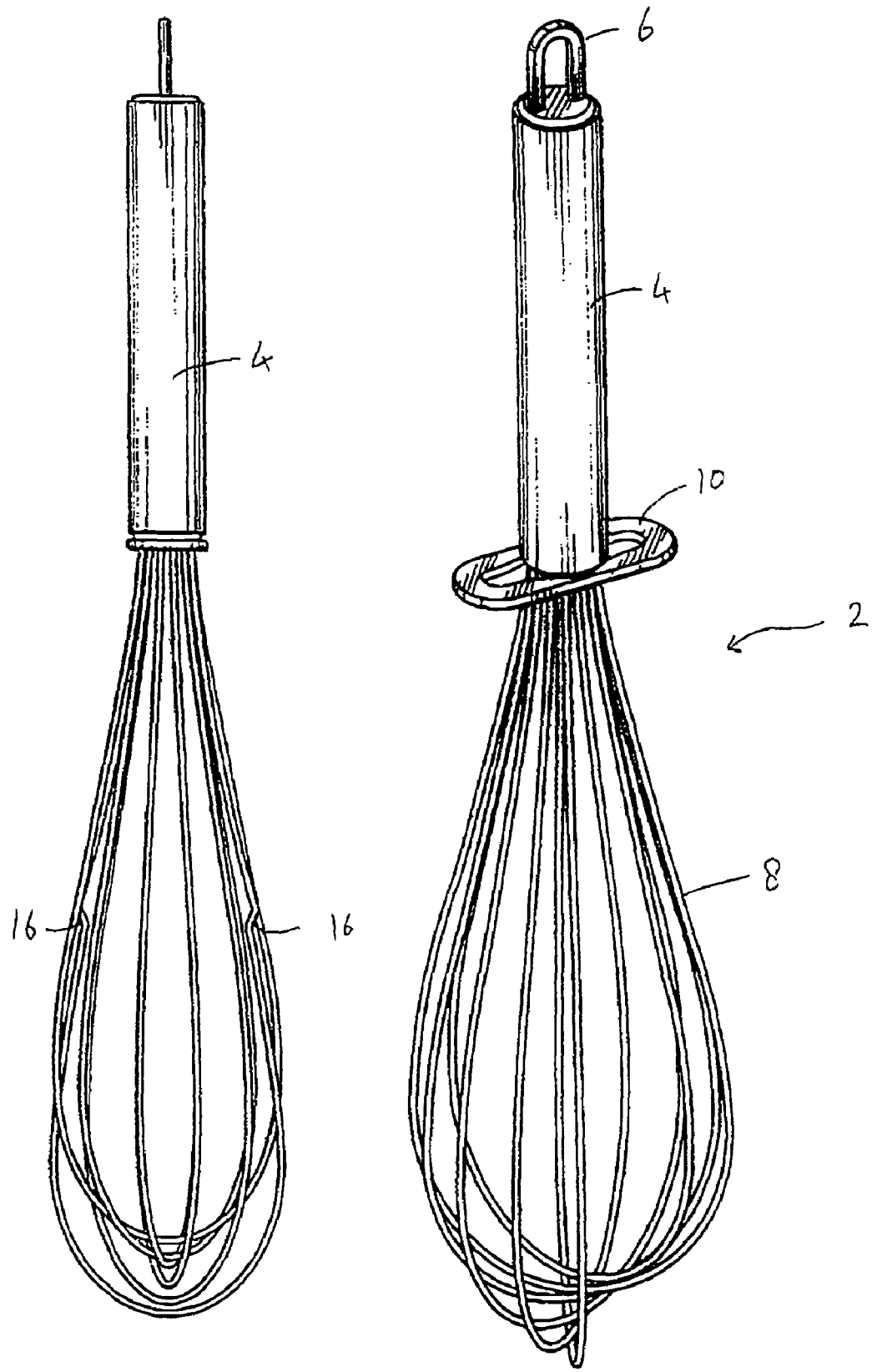
FIG. 1 is a perspective view illustrating a whisk according to an embodiment of the invention.
FIG. 2 shows the whisk of FIG. 1 rotated about a vertical axis.

Turning now to the drawings, FIG. 1 shows the whisk generally designated 2. The whisk 2 comprises a handle 4 provided with a hanging hook 6. Secured to a lower end of the handle 2 are a plurality of wire loops 8 each making a loop extending between opposite sides of the lower region of the handle 4, the wire loops being disposed in angularly spaced orientation about a vertical axis or the axis of the handle to form a balloon shape, as is conventional. The wires may be of metal such as stainless steel, or may be plastic coated metal or formed of plastic provided this affords the wires a degree of springiness.

Figure 3:
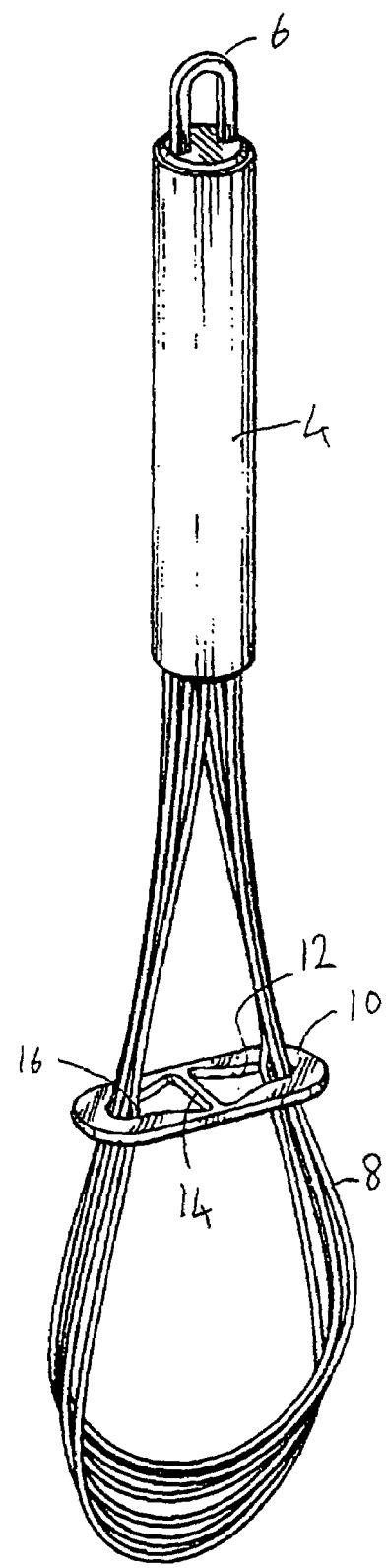
FIG. 3 is a perspective view of the whisk in a collapsed condition.

Unlike conventional whisks, the whisk 2 is provided with an elongate collar or grip 10 which surrounds the wires. As best seen in FIG. 3 the collar 10 is provided with a pair of generally triangular-shaped openings 12 separated by a crosspiece 14 having laterally broader regions near their mid-portions adjacent the crosspiece reducing to narrower portions at the opposite ends distant from the crosspiece 14. One half of each wire loop 8 extends through each opening. It may also be arranged that there is a greater spacing between adjacent loops at the handle 4 at the position adjacent the crosspiece 14 when in the position of FIG. 1 to more easily accommodate this.

Figure 4:
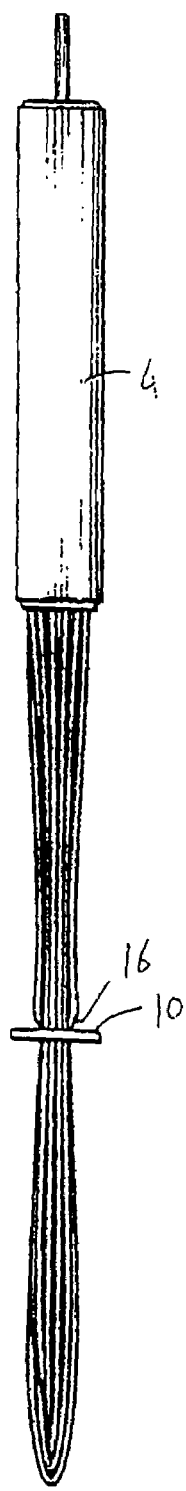
FIG. 4 shows the whisk in a view corresponding to FIG. 2 when collapsed.

When in the position illustrated in FIG. 1 with the collar 10 pushed up against the underside of the handle 4, the wires extend through the wider region of the openings 12 and are able to adopt their normal positions in which they assume the balloon shape. As the collar 10 is pushed down away from the handle 4 the wires move into the narrower end regions, whereby instead of adopting the balloon shape, the wire loops are squeezed together into a generally planar or coplanar configuration shown in FIG. 3 and end-on in FIG. 4.

As can be seen best in FIG. 2, one of the wire loops is provided at opposite sides with an inwardly extending kink 16 at the position which corresponds to the lowermost position to which the collar 10 can be pushed, these kinks 16 serving as a detent for holding the collar 10 in position when collapsed. It may be arranged that more than one of the wire loops has such a detent, but one is generally sufficient. In the collapsed condition of FIGS. 3 and 4 the whisk 2 is considerably more compact than when in the "in use" condition and can be conveniently stored. When it is desired to use the whisk 2, the user simply pushes the collar 10 up out of the detents 16 towards the handle 2, the springiness of the wires 8 causing them to resume the balloon configuration.

Although the collar 10 encloses the wires it could alternatively be arranged that the collar is open or partly open on one side in the manner of a "C" shape, provided that the regions surrounding the wire loops do narrow towards opposite ends for the purpose of forcing the wire loops together. The collar could then be removable from the wire loops if required.

The invention claimed is:

1. A balloon whisk comprising a handle and a plurality of wire loops extending from an end of the handle and disposed spaced angularly about the handle, and an elongate collar defining an opening or pair of openings, the plurality of wire loops extending through the opening or a side of each wire loop of the plurality of wire loops extending through each of the pair of openings, the plurality of wire loops being configured to be of greater lateral dimension towards a central region and tapering to be of reduced lateral dimension away from the central region, the collar being movable to a position towards the central region and away from the end of the handle, the opening or pair of openings defined by the collar having such a geometry as to urge in an angular direction the plurality of wire loops together to assume a generally planar configuration when the collar is in the position towards the central region and away from the end of the handle.

2. A balloon whisk according to claim 1 wherein the collar comprises an elongate member having first and second openings separated by a central crosspiece, the openings being of generally triangular shape.

3. A balloon whisk according to claim 2 wherein one or more wire loops are formed with a kink constituting a detent for holding the collar in position in the collapsed condition.

4. A balloon whisk according to claim 2 wherein opposite sides of each wire loop of the plurality of wire loops extend respectively through the first and second openings.

5. A balloon whisk according to claim 1 wherein one or more wire loops are formed with a kink constituting a detent for holding the collar in position in the collapsed condition.

6. A balloon whisk comprising a handle and a plurality of wire loops extending from an end of the handle and disposed spaced angularly about the handle, the wire loops having first and second opposite sides extending from the handle and a central region joining the first and second sides away from the handle;

an elongate collar defining a first and a second opening, the first side of each of the wire loops extending through the first opening and the second side of each of the wire loops extending through the second opening, the wire loops are configured to be of greater lateral dimension towards the central region and tapering to be of reduced lateral dimension away from the central region, the collar being movable to a position towards the central region and away from the handle; the first and second openings defined by the collar having such a geometry as to urge the plurality of wire loops together in an angular direction toward a generally planar configuration when the collar is moved towards the central region and away from of the handle.

7. A balloon whisk according to claim 6, wherein the wire loops are configured to be of greater lateral dimension towards the central region and tapering to be of reduced lateral dimension away from the central region, and the openings are spaced so that the sides of the loop are urged toward each other as the collar moves towards the central region.

8. A balloon whisk according to claim 7 wherein the collar comprises an elongate member having the first and second openings and the openings are each of generally triangular shape.

* * * * *